May 6, 1958

G. CURRIE 2,833,975

MOTOR SYSTEM

Filed April 7, 1955

United States Patent Office 2,833,975
Patented May 6, 1958

2,833,975
MOTOR SYSTEM

Gilbert Currie, Williamsville, N. Y., assignor to Westinghouse Electric Corporation, East Pittsburgh, Pa., a corporation of Pennsylvania Application April 7, 1955, Serial No. 499,980

7 Claims. (Cl. 318—369)

My invention relates to motor systems and has particular relation to systems of the type including a brake which is magnetically actuable.

In motor systems in accordance with the teachings of the prior art, of which I am aware, the brake is urged into braking engagement with the motor by mechanical means such as a spring, for example, and the force of the spring may be counteracted electrically by an electromagnet, for example, which must be maintained energized so long as the brake is maintained out of braking engagement with the motor. In certain industries, particularly some which have come into being during the last decade, motor systems of the type with which my invention concerns itself are operated for unusually long time intervals of the order of a year or even longer. The operation of prior art motors during such long intervals gives rise not only to considerable consumption of power in the braking magnet but also to the possibility that the braking coil may burn out some time during the interval, releasing the brake so that it is in braking engagement when the motor is operating at high speed and soon becomes deteriorated. Because of this latter characteristic inherent in the use of prior art motor systems, the practice has developed to include in specifications for motor systems the requirement that they have the so-called "burn-free" feature, that is, that the brake and its actuating components be so constructed that in the event the brake is allowed to come into braking engagement with the motor while the motor is still running, the brake will burn itself freely without substantial damage. The requirement that the motor system include the "burn-free" feature necessarily introduces complexity into the motor system.

It is, accordingly, broadly an object of my invention to provide a motor system including an electrically actuable braking mechanism, in the use of which the braking mechanism shall not be continuously energized while the motor is in operation.

Another object of my invention is to provide a motor system having a braking mechanism which shall not require the burn-free feature to preclude excessive damage to the brake.

Still another object of my invention is to provide a motor system having a novel braking coil mechanism.

A still further object of my invention is to provide a motor system having a novel brake actuating mechanism.

In accordance with my invention, I provide a motor system including an energizing circuit for the electrically actuable means which actuates the brake, (such as the electromagnet) which circuit is closed only while the speed of the motor is maintained below a predetermined magnitude and is open so long as the motor speed exceeds this magnitude. In addition, I provide a latching mechanism responsive to the speed of the motor which latches the brake out of braking engagement with the motor when the motor speed is above the predetermined magnitude. The magnitude at which the supply circuit for the actuable means is opened and the brake is latched out of braking engagement with the motor is below the normal operating speed of the motor. Thus, at the speed at which the motor normally operates the electrically actuable means is deenergized and the brake is held in disengagement from the motor by the latching means. Specifically, I provide in accordance with my invention means for actuating the latching means and deenergizing the actuable means by operation of the governor of the motor.

The novel features that I consider characteristic of my invention are discussed generally above. The invention itself, both as to its organization and its method of operation, together with additional objects and advantages thereof, will be understood from the following description of a specific embodiment when read in connection with the accompanying drawings, in which.

Figure 1:
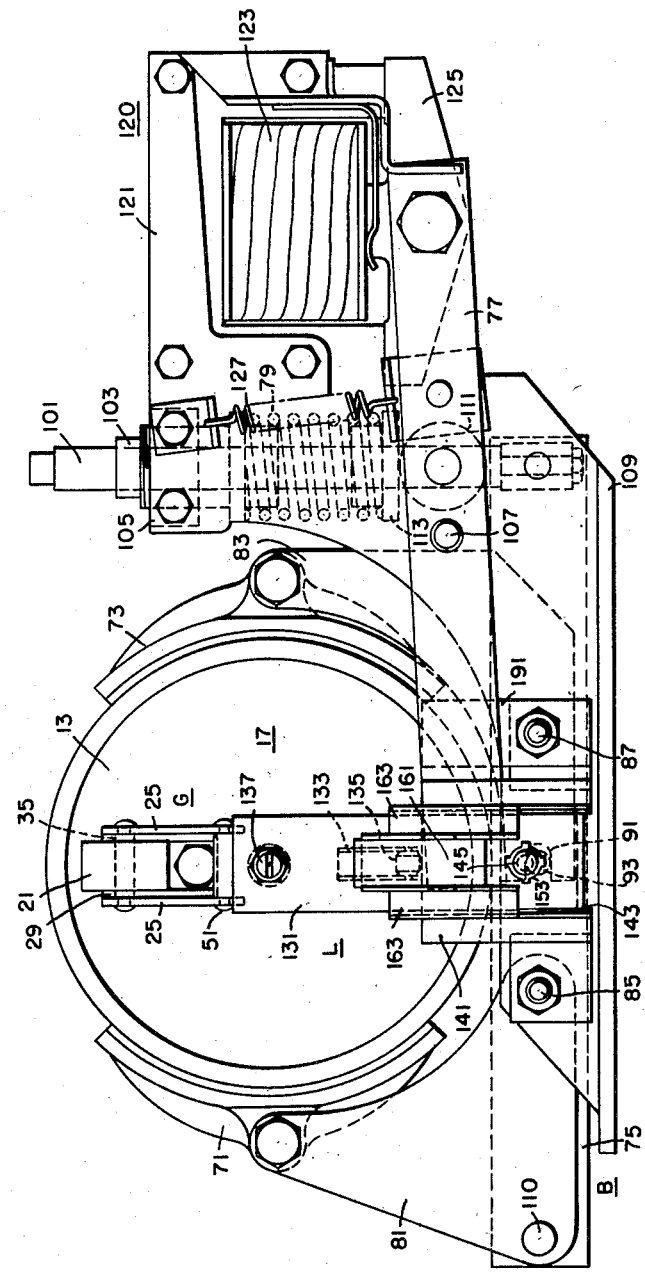
Figure 1 is a view in elevation of the motor system.

The apparatus shown in the drawing includes a motor M, a braking mechanism B, a circuit C for actuating the brake of the motor and a latching mechanism L. The apparatus may be supplied with power through conductors L1, L2, L3 which may be connected to a commercial polyphase supply through the usual disconnects and circuit breakers SW.

The motor M may be of any suitable type including the usual stator (not shown), a rotor and a brake wheel 13. The brake wheel 13 is in the form of a ring having a hub 15 supporting the ring through a conically shaped web 17. The rotor drives a shaft 19 which at one of its ends is connected to drive the motor load. At the other end the shaft 19 has secured thereon the brake wheel 13 on the hub 15 of which the governor G of the motor is mounted. The governor is disposed within the hollow of the web 17 and includes a plurality of cylinders 21 and 22 of substantial mass and a plurality of pairs of hinged arms 25, 27, 29 and 31. The cylinders 21 and 22 are centrally mounted between the pairs of arms on the pins 35 and 37, respectively, which constitute the hinge axes of the arms 25 and 29 and 27 and 31 respectively. The arms 29 and 31 are at their remaining end hinged on pins 41 and 43 secured to a rectangular block 45 fastened to the hub 15. The other arm pairs 25 and 27 are pivoted on pins 51 and 53 secured to a rectangular block 55 mounted on a flanged sleeve 57 which is slidable on another pin 61 axially secured in the shaft 19 but is urged outwardly by a spring 63 engaging the block 45 secured to the hub 15 at one end and the flange 65 of the flanged sleeve at the other.

As the speed of the motor shaft 19 varies the masses 21 and 22 move outwardly or inwardly depending on the sense of the variation causing the sleeve 57 to move inwardly or outwardly against the action of the spring 63.

The essential mechanical features of the brake B are described in detail in my application Serial No. 249,498, filed October 3, 1951, and assigned to Westinghouse Electric Corporation. The mechanical structure of this brake is also described in Westinghouse leaflet No. B5652 entitled "Type AK New Single Adjustment A.-C. Brake." Application Serial No. 249,498 and leaflet B5652 are incorporated herein by reference.

The brake B includes a pair of brake shoes 71 and 73 having braking surfaces contoured to fit the brake wheel, a main lever 75, a magnet lever 77 and a brake spring 79. The brake shoes 71 and 73 are pivotally supported on arms 81 and 83 respectively which are in turn pivotally supported on fixed pins 85 and 87 secured to the brake base or frame 109. The left-hand brake arm 81 is of triangular shape and its pivot pin is provided with a friction device (not shown) which produces friction between the arm 81 and main lever 75. The other arm 83 is of arcuate shape having a slot 91 at the end adjacent the pivot pin 87 on the main lever 75. This slot engages another pin 93 on the main lever permitting the arm 83 to adjust itself relative to the main lever 75. The purpose of the friction device is disclosed in my above application Serial No. 242,498. Briefly the frictional force produced by the device allows the brake arms to position themselves with the brake wheel in situations in which the brake wheel 13 may not be properly centered with reference to the brake mounting.

The main lever 75 is secured near one end of a threaded rod 101 slidable in a bearing 103 in a rectangular block 105 secured to the brake base 109. The rod 101 is substantially perpendicular to the line of the pivots 85 and 87 of the brake arms 81—83 in the upper open position of the brake. The main lever 75 is pivotally connected to arm 81 at pin 110 on the extreme left and slidably connected at pin 93. At pin 85 and pin 87 the main lever 75 has large holes to allow for movement with respect to pins 85 and 87. The rod 101 is movable by the magnet lever 77 which is pivotally mounted on pin 107 in the frame 109 of the brake. The rod 101 is screwed into a pin 111 pivotally connected to the lever 77. The rod 101 and the magnet lever 77 secured to it are urged downwardly towards the position in which the brake is closed by the brake spring 79 which engages the block 105 in which the rod bearing 103 is provided at one end and a washer 113 secured to the rod 101 itself and bearing on pin 111. The force of this spring 79 is transmitted through the main lever 75 to the brake shoes 71 and 73 and causes the brake shoes to apply pressure to the brake wheel 13. The magnitude of the pressure is determined by the extent to which the bearing 103 is screwed into the block 105. To take up for brake lining wear the rod 101 may be screwed into pin 111.

The brake mechanism B also includes an electromagnet 120 having a fixed core 121 provided with an energizing coil 123 and an armature 125 which is pivotally mounted on the magnet lever 77. The mass of the magnet lever 77 and armature 125 is counteracted by a spring 127. When current is supplied to the coil 123 the fixed core 121 is energized causing the armature 125 to move into engagement with the fixed core. The movement of the armature 125 raises the rod 101 against the force of the spring 79 increasing the compression of the spring. The raising of the rod 101 also pivots the main lever 75 causing the brake shoes 71 and 73 to move away from engagement with the brake wheel 13. When the coil 123 is deenergized, the force of spring 79 applies brake pressure to the wheel 13.

The latching mechanism L includes an L-shaped strip 131 preferably of resilient metal. The strip carries a projection 133 intermediate its ends, from the lower portion of which a roller 135 extends. Near its upper end the strip 131 carries an adjusting bolt 137 which may be screwed into the strip 131 so that it projects a predetermined distance out of one side. The strip 131 is mounted on a bracket plate 141 which is vertically supported on bracket 109. The bracket plate 141 has a notch 143 just above the region where it joins bracket 109 and a pin 145 extends from the plate 141 above the slot. The strip 131 is mounted in slidable engagement with the pin 145 and with its lip under the notch 143 and is urged toward the plate 141 by a spring 151 which encircles the pin 145 and engages dish-shaped washers 153 near the head of the pin 145 and adjacent the strip. The strip 131 is so positioned that the tip of the adjusting bolt 137 is in the path of the sleeve 57 and the strip is moved outwardly by the sleeve as the sleeve moves outwardly and is retracted as the sleeve moves inwardly.

The latching mechanism also includes a switch 161, preferably a microswitch which is supported between a pair of plates 163 extending at an angle from the plate 141. The switch 161 is positioned outwardly from the strip 131 in such a position that when the sleeve 57 is disengaged from the actuating strip 131 (that is when the motor is above a predetermined speed) the switch is open (Fig. 2) and when the strip 131 is urged outwardly by the coaction of the flanged sleeve 57 and the setting bolt 137, the actuating lever 181 of the switch is compressed at a predetermined position of the strip and the switch is closed (Fig. 3). Thus, by properly setting the adjusting bolt 137 the switch 161 may be set to be closed when the speed of the motor is reduced to a predetermined magnitude. It is important that the bolt 137 be so set relative to the strip 131 that as the speed of the motor increases the switch 161 shall open only after the latch has latched the brake in open position. If the switch is opened before the brake is latched, the brake will be applied to reduce the speed of the motor so that the switch will be closed again, releasing the brake and repeated opening and closing of the brake will take place.

Another bracket plate 191 is mounted adjacent the electromagnet 120. The outer surface of the plate 191 is laterally displaced from the inner surface of plate 141 so that the two plates form a guide between which the magnet lever passes at its end remote from the magnet 120.

Figure 2:
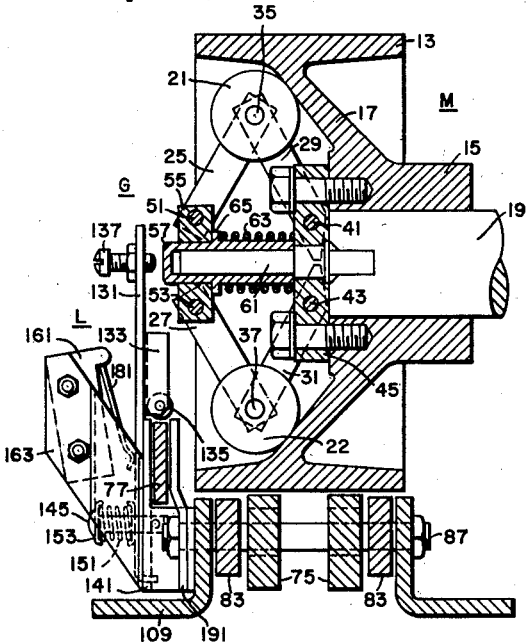
Fig. 2 is a view in vertical section of the motor system shown in Fig. 1.
Figure 3:
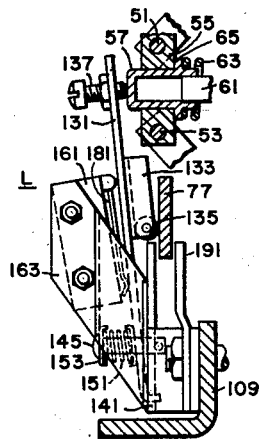
Fig. 3 is a fragmental view in section showing the latching mechanism in accordance with my invention in the position which it has when the motor is deenergized.
Figure 4:
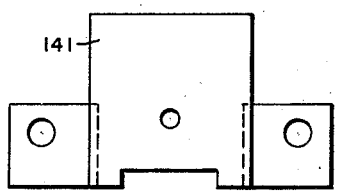
Fig. 4 is a view in front elevation of a supporting bracket for certain components of the locking mechanism.
Figure 5:
Fig. 5 is a view looking up of the bracket shown in Fig. 4.

The strip 131 is so positioned that when the motor speed is above a predetermined magnitude and the strip 131 in its innermost position the roller 135 on projection 133 extends over the magnet lever 77 and prevents the magnet lever 77 from moving upwardly between the guide 141—191 (Fig. 2). When the motor is deenergized, the speed of the motor M is reduced and the sleeve 57 moves outwardly engaging the setting bolt 137, the strip 131 is pivoted outwardly causing the projection 133 to disengage the magnet lever 77 and permit the brake B to move to the engaged position under the action of the brake spring 79 at a predetermined motor speed. The switch 161 is closed by the first movement of strip 131 and before the latch has been tripped. Since the motor has been deenergized, no current flows through the coil until the motor is again energized.

The circuit C includes the brake coil 123 and the switch 161 which are connected in series between a pair of the motor conductors L2 and L3 so that the coil 123 is supplied with single phase current from these conductors. This switch 161 is closed with the motor deenergized (Fig. 3) and the brake coil is thus conditioned to be supplied with current through the circuit C when the disconnects SW are closed. When the switch 161 is open with the motor up to predetermined speed the circuit C is open and current does not flow through coil 123.

Figure 6:
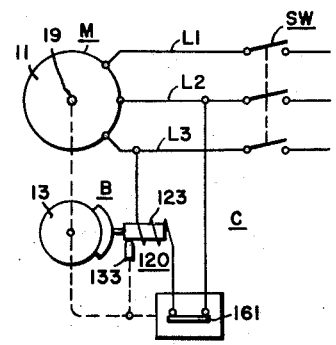
Fig. 6 is a circuit diagram of apparatus in accordance with our invention.

In its deenergized condition the motor circuit is as shown in Fig. 6 and the strip 131 is in the position shown in Fig. 3. When the motor M is to be energized the disconnects are closed supplying power not only to the motor but to the circuit C. The supply of power to the circuit C causes the fixed core 121 to be magnetized and the brake lever 77 is pivoted against the action of the brake spring 79 to disengage brake shoes 71 and 73 from the brake wheel 13. Since the motor M is now energized it rotates and as its speed increases the sleeve 57 is retracted from the setting bolt 137. The strip 131 then is urged under the action of the spring 151 to move into latching position and switch 161 is opened so that the magnet lever 77 is latched in the position in which it is actuated by the brake magnet 121, and current to the brake coil 123 is discontinued. But since the magnet lever 77 is latched in the position in which it has been moved by the brake magnet 121 the brake shoes 71 and 73 remain disengaged from the brake wheel 13 independently of the brake magnet. The motor now operates in its normal manner. The brake coil 123 is deenergized so that regardless of over how long a time interval the motor operates the brake coil does not draw power and is not subjected to being damaged. In addition, the problem of the noise which an A. C. electromagnet (such as 120) produces does not arise and it is not necessary, for example, to provide shading coils for the brake. In the event that a power outage occurs on one of the conductors L2 and L3 connected to the circuit C the problem arising from the engagement of the brake while the motor is still being supplied from conductor L1 and the other conductor does not arise. Since the brake B is held latched out of braking engagement with the motor M independently of the brake magnet, such a power outage does not have the effect of causing the brake to close while the motor is still rotating and the brake will function to stop the motor independent of the electrical means being actuated only by a reduction of the motor speed to a predetermined value. It is not then necessary to include in the brake system the so-called burn-free feature.

When the operation of the motor M is to be stopped the disconnects SW are opened. Since the motor M is now no longer supplied with current its speed is reduced and the sleeve 51 moves outward. This sleeve is set to engage the setting bolt 137 at the speed at which it is desired that the brake B be applied. At this point the magnet lever 77 is unlatched and the brake B is pivoted into braking engagement with the motor M. The switch 161 has been closed but since the disconnects SW are open the brake remains unaffected.

While I have shown and described a certain specific embodiment of my invention other modifications thereof are possible. My invention, therefore is not to be restricted except insofar as is necessitated by the spirit of the prior art.

I claim as my invention:

1. A motor system comprising a motor, a brake for said motor cooperative with said motor, means maintaining said brake in braking engagement with said motor in the deenergized condition of said motor, a speed responsive governor for said motor coupled to said motor to be actuated thereby, electrically actuable means cooperative with said brake and said maintaining means which when energized disengages said brake from braking engagement with said motor, power supply means for said motor and actuable means, and means including switch means closed in the deenergized condition of said motor and connected between said power supply means and said actuable means for supplying current to said actuable means when said switch means remains closed and said power supply means is energized, the said system being characterized by mechanical latch means cooperative with said brake and switch means to latch said brake in braking disengagement and to permit said switch means to open, and by means responsive to said governor when the motor speed falls below a predetermined magnitude to unlatch said brake and close said switch means.

2. A motor system comprising a motor, a brake for said motor cooperative with said motor, means maintaining said brake in braking engagement with said motor in the deenergized condition of said motor, a speed responsive governor for said motor coupled to said motor to be actuated thereby, electrically actuable means cooperative with said brake and said maintaining means which when energized disengages said brake from braking engagement with said motor, and a circuit connected to said actuable means for supplying current to said actuable means, the said system being characterized by switch means connected in said circuit which when closed conditions said circuit to supply current as aforesaid and by means actuable by said governor for maintaining said switch means open and for holding said brake disengaged from braking engagement with said motor when the speed of said motor is greater than a predetermined limited range of speeds and for closing said switch and permitting said brake to come into braking engagement with said motor when said speed is less than said range.

3. A motor system comprising a motor, a brake for said motor cooperative with said motor, means maintaining said brake in braking engagement with said motor in the deenergized condition of said motor, a speed responsive governor for said motor coupled to said motor to be actuated thereby, electrically actuable means cooperative with said brake and said maintaining means which when energized disengages said brake from braking engagement with said motor, and a circuit connected to said actuable means for supplying current to said actuable means, the said system being characterized by switch means connected in said circuit which when closed conditions said circuit to supply current as aforesaid and by means actuable by said governor for maintaining said switch means open when the speed of said motor is greater than a predetermined limited range of speeds and for closing said switch when said speed is less than said range.

4. A motor system comprising a motor, a brake for said motor cooperative with said motor, means maintaining said brake in braking engagement with said motor in the deenergized condition of said motor, a speed responsive governor for said motor coupled to said motor to be actuated thereby, electrically actuable means cooperative with said brake and said maintaining means which when energized disengages said brake from braking engagement with said motor, and a circuit connected to said actuable means for supplying current to said actuable means, the said system being characterized by switch means connected in said circuit which when closed conditions said circuit to supply current as aforesaid and by means actuable by said governor for maintaining said switch means open and for holding said brake disengaged from braking engagement with said motor when the speed of said motor is greater than a predetermined limited range of speeds, for closing said switch when said motor is at a limiting speed less than said range and for permitting said brake to come into braking engagement with said motor when said motor is at a speed less than said limiting speed.

5. A motor system comprising a motor, a brake for said motor cooperative with said motor, means maintaining said brake in braking engagement with said motor in the deenergized condition of said motor, a speed responsive governor for said motor coupled to said motor to be actuated thereby, electrically actuable means cooperative with said brake and said maintaining means which when energized disengages said brake from braking engagement with said motor, and a circuit connected to said actuable means for supplying current to said actuable means, the said system being characterized by means actuable by said governor and cooperative with said brake for holding said brake disengaged from braking engagement with said motor when the speed of said motor is higher than a predetermined magnitude and permitting said brake to come into braking engagement with said motor when the speed of said motor is lower than said magnitude.

6. The system for operating the brake of a motor with apparatus including a brake coil for disengaging the brake from braking engagement with the motor when said coil is energized and a circuit when closed for energizing the coil, which comprises means for energizing said coil when the energization of said motor is being initiated, means for latching said brake disengaged from braking engagement independently of said coil when the motor is at least at a predetermined speed, and means for opening said circuit when said motor is at least at said speed.

7. A motor system comprising a motor, a brake for said motor cooperative with said motor, means maintaining said brake in braking engagement with said motor in the denergized condition of said motor, electrically actuable means cooperative with said brake and said maintaining means which when energized disengages said brake from braking engagement with said motor, and a circuit connected to said actuable means for supplying current to said actuable means, the said system being characterized by means responsive to the speed of said motor and cooperative with said brake for holding said brake disengaged from braking engagement with said motor when the speed of said motor is higher than a predetermined magnitude and permitting said brake to come into braking engagement with said motor when the speed of said motor is lower than said magnitude.

References Cited in the file of this patent

FOREIGN PATENTS 647,595    Germany _____ July 8, 1937